United States Patent [19]

Fukuchi

[11] Patent Number: 5,229,434
[45] Date of Patent: Jul. 20, 1993

[54] PROCESS FOR THE PRODUCTION OF REACTIVE MICROGEL AND RESIN COMPOSITION CONTAINING THE MICROGEL

[75] Inventor: Yoshihisa Fukuchi, Tokyo, Japan

[73] Assignee: Toyo Ink Manufacturing Co., Ltd., Tokyo, Japan

[21] Appl. No.: 847,306

[22] Filed: Mar. 6, 1992

Related U.S. Application Data

[62] Division of Ser. No. 451,191, Dec. 15, 1989, Pat. No. 5,120,796.

[30] Foreign Application Priority Data

Dec. 20, 1988 [JP] Japan .................. 63-321651

[51] Int. Cl.$^5$ .................................................. G03C 1/68
[52] U.S. Cl. ...................................... 522/110; 522/112; 525/286
[58] Field of Search .................. 522/110, 112; 525/286

[56] References Cited

U.S. PATENT DOCUMENTS

| | | | |
|---|---|---|---|
| 4,290,932 | 9/1981 | Wright et al. | 260/29.6 WB |
| 4,487,855 | 12/1984 | Shih et al. | 523/201 |
| 4,598,131 | 7/1986 | Prucnal | 525/440 |
| 4,753,865 | 6/1988 | Fryd et al. | 522/110 |

*Primary Examiner*—Marion E. McCamish
*Assistant Examiner*—Mark A. Chapman
*Attorney, Agent, or Firm*—Wenderoth, Lind & Ponack

[57] ABSTRACT

A hardenable resin composition comprising a reactive microgels having a functional group on a surface of each of fine particles of the microgels, produced by reacting fine microgel particles (A) synthesized from a monomer having a polymerizable double bond by emulsion polymerization using, as an emulsifier, a compound containing tertiary ammonium salt, with a compound (B) having, in the molecule, an epoxy group to react with the tertiary ammonium salt and at least one reactive functional group other than the epoxy group, and a resin.

7 Claims, No Drawings

PROCESS FOR THE PRODUCTION OF REACTIVE MICROGEL AND RESIN COMPOSITION CONTAINING THE MICROGEL

This application is a division of application Ser. No. 451,191 filed Dec. 15, 1989, now U.S. Pat. No. 5,120,796.

FIELD OF THE INVENTION

This invention relates to a process for the production of reactive microgels having a reactive group such as a carbon-carbon double bond, hydroxyl group, carboxyl group, or the like and a resin composition containing the reactive microgels. More specifically, this invention relates to a process for the production of reactive microgels to contribute to improvement of properties such as photosensitivity, water resistance, solvent resistance, etc., a process for the production of reactive microgels useful as a high-resolution, high-reactivity resist material for manufacture of printed circuit boards, machine plates for printing, semiconductor elements, etc., a coating composition, a printing ink and a reactive additive, and a resin composition containing the microgels.

PRIOR ART OF THE INVENTION

Microgels are gelled or crosslinked polymer particles having about colloidal size, e.g. a diameter of 0.001 to 10 μm, and in general, have recently attracted attention as a new polymeric material synthesized by emulsion polymerization. In particular, since W. Funke synthesized microgels having a reactive group on the surface in 1975, the microgels have attracted remarkable attention and many polymer researchers have made studies thereof [W. Obrecht, U. Seitz, W. Funke, Am. Chem. Soc., Div. Polym. Chem. Prepr. 16(1), 149 (1975)]. In the process of Funke, the microgels are synthesized by emulsion-polymerizing a monomer having at least two double bonds under very moderate conditions and modifying the unreacted double bonds on the surface with other reagent to convert them to various reactive functional groups. As examples, there have been proposed processes for conversion to a hydroxyl group with borane, to a halogen group with hydrogen halide, to a carboxyl group with ozone, and the like. Since, however, reactions in these processes do not take place in a water-existing system, it is required that microgels should be separated from an aqueous dispersion, purified, dried, and then reacted with various reagents by dispersing them in an organic solvent such as DMF, pyridine, etc., whereby a reactive functional group is introduced. Thus, these processes take too much time and require very high cost. The use of the microgels as an industrial material is therefore limited. Yamazaki, et al have made an attempt to synthesize reactive microgels in a one-step reaction [Yamazaki, Hattori, Hyomen (Surface) 1987, 25, 86].

However, the functional groups that can be introduced by the above reaction are extremely limited in kind, and in particular, since functional groups having a carbon-carbon double bond react due to an attack of radical in emulsion polymerization, it has been difficult to synthesize reactive microgels having a double bond.

Azuma (Japanese Patent Laid-Open Publication No. 80942/1989) discloses a process for the production of photosensitive microgel particles having a structure in which a cinnamic acid ester is formed on the surface of each of the microgel particles. This process comprises separating (meth)acrylate-based microgel particles formed in an aqueous medium from the aqueous medium, and then reacting them with a cinnamic acid or a derivative thereof in an organic solvent. However, this process has a problem that the procedure for isolation of the microgel particles from the aqueous medium is complicated. There is also a problem that the organic solvent for esterification is expensive.

SUMMARY OF THE INVENTION

It is an object of this invention to provide a novel process for the production of reactive microgels having a reactive functional group on the surface.

It is another object of this invention to provide a novel process for the production of reactive microgels, which makes it possible to attach various functional groups quantitatively.

It is further another object of this invention to provide a novel process for the production of reactive microgels, which makes it possible to attach reactive functional groups to fine microgel particles formed by emulsion polymerization in an aqueous medium without separating the fine microgel particles from the aqueous medium.

It is further another object of this invention to provide a novel hardenable resin composition containing reactive microgels.

It is still further another object of this invention to provide a novel photosetting or heat-setting resin composition containing reactive microgels.

It is yet another object of this invention to provide a novel water-soluble photohardenable resin composition.

According to this invention, there are provided:

a process for the production of reactive microgels having a functional group on the surface of each of fine particles of the reactive microgels, which comprises reacting fine microgel particles (A) synthesized from a monomer having a polymerizable double bond by emulsion polymerization using, as an emulsifier, a compound containing tertiary ammonium salt, with a compound (B) having, in its molecule, an epoxy group to react with the tertiary ammonium salts and at least one reactive functional group other than the epoxy group, and a hardenable resin composition comprising the above reactive microgels and a resin.

DETAILED DESCRIPTION OF THE INVENTION

The present inventor has made a diligent study and found an addition reaction which takes place even in water, and the use of this finding has led to a finding of a process for quantitatively attaching a functional group other than an epoxy group, e.g. an unsaturated double bond, hydroxyl group, carboxyl group, etc., without isolating fine microgel particles from an aqueous dispersion.

In this invention, concerning monomers having a polymerizable double bond for synthesis of the fine microgel particles (A), examples of monofunctional monomers are as follows.

(a) (meth)acrylic compounds $C_1$-$C_{18}$ alkyl esters of (meth)acrylic acid such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate, etc.; glycidyl (meth)acrylate;

$C_2$–$C_8$ alkenyl esters of (meth)acrylic acids such as allyl (meth)acrylate, etc.; $C_2$–$C_8$ hydroxyalkyl esters of (meth)acrylic acids such as hydroxyethyl (meth)acrylate, hydroxypropyl (meth)acrylate, etc.; $C_3$–$C_{19}$ hydroxyalkenyl esters of (meth)acrylic acids such as allyoxyethyl acrylate, etc.; (meth)acrylic acid.

(b) vinyl aromatic compounds styrene, p-methylstyrene, p-chlorostyrene, etc.

(c) others (meth)acrylonitrile, methyl isopropenyl ketone, vinyl acetate, vinyl propionate, vinyl pivalate, etc.

Examples of polyfunctional monomers having two or more carbon-carbon double bonds useful for three-dimensional crosslinkage within each of the fine microgel particles (A) are the following.

(a) (meth)acrylic compounds tri(meth)acrylic ester of trimethylolpropane, di(meth)acrylic ester of glycols, di(meth)acrylic ester of polyol, di(meth)acrylic ester of polyurethane, di(meth)acrylic ester of polyester, etc.

(b) polyolefin compounds butadiene, isoprene, chloroprene, divinyl benzene, diallyphthalate, etc.

These unsaturated monomers having polymerizable double bond(s) are suitably selected depending upon their physical properties, and they are usable alone or in combination.

The molar ratio between the monofunctional monomer and the polyfunctional monomer in use is usually 100:0.1~50, preferably 100:0.1~10, whereby the degree of three-dimensional crosslinkage within each of the fine microgel particles is suitable controlled.

However, it is not essential in this invention to use a polyfunctional monomer. That is, a reactive emulsifier is usable as an emulsifier in this invention, and the use of a reactive emulsifier can achieve three-dimensional crosslinkage within each of the fine microgel particles (A).

The compound containing tertiary ammonium salts, usable as an emulsifier for synthesis of the fine microgel particles (A), is selected from those having a function of an emulsifier, and in general, there are used compounds having a tertiary amino group is neutralized into a tertiary ammonium salt with acid.

As the emulsifiers having a lower molecular weight, it is possible to cite those prepared by neutralizing reactive monomers having an amino group, i.e. tertiary amines-examples thereof are shown below-to tertiary ammonium salts with an acid such as hydrochloric acid, nitric acid, sulfuric acid, formic acid, acetic acid, propionic acid, butyric acid, (meth)acrylic acid, etc.:

$C_0$–$C_{20}$ alkyl and alkenyl tertiary amines of dimethyllaurylamine, dimethylmyristylamine, dimethylpalmitylamine, dimethylstearylamine, diethyllaurylamine, diethylmyristylamine, diethylpalmitylamine, diethylstearylamine, etc. 2,2-dimethylaminoethyl (meth)acrylate, 2,2-diethylaminoethyl (meth)acrylate, etc.

Further, as polymer emulsifiers, it is also possible to cite those prepared by copolymerizing a compound having an amino group such as 2,2-dimethylaminoethyl (meth)acrylate, 2,2-diethylaminoethyl (meth)acrylate, etc., with at least one of the following other compounds, e.g. a vinyl monomer, and then neutralizing the resultant copolymer with an acid to convert it a tertiary ammonium salt.

$C_1$–$C_{18}$ alkyl esters of (meth)acrylates such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate, etc.; glycidyl (meth)acrylate; $C_2$–$C_8$ alkenyl esters of (meth)acrylates such as allyl (meth)acrylate, etc., $C_2$–$C_8$ hydroxyalkyl esters of (meth)acrylates such as hydroxyethyl (meth)acrylate, hydroxypropyl (meth)acrylate, hydroxybutyl (meth)acrylate, etc; $C_3$–$C_{19}$ alkenyloxyalkyl esters of (meth)acrylates such as allyoxyethyl (meth)acrylate, etc.; (meth)acrylic acid, etc.

Furthermore, examples of the emulsifiers include those formed by neutralizing amino group-containing polymers, e.g. natural polymers such as chitosan, etc., or synthetic polymers such as polyethylene imine, etc., with an acid to convert them to tertiary ammonium salts.

These high-molecular emulsifiers can be used without any change, or after polymerizable double bonds are introduced by reacting part of their tertiary ammonium salts with a compound containing an epoxy group such as glycidyl (meth)acrylate, etc., and a tertiary ammonium salt.

The above high-molecular emulsifiers also have a function to control the degree of water-solubility. These emulsifiers are used in an amount of 0.1 to 80% by weight, preferably 3 to 50% by weight, based on the monomer having a polymerizable double bond, and the temperature for the emulsion polymerization is between 50° and 95° C., preferably between 65° and 80° C. The emulsion polymerization is carried out under the conditions that the solid content of the monomer and the emulsifier in total is 10 to 50% by weight, preferably 15 to 30% by weight. In this invention, the fine microgel particles formed by the emulsion polymerization usually have a diameter, measured by optical scattering method, of 10 to 200 nm.

A tertiary ammonium salt present on each of the fine microgel particles (A) formed as above and the compound (B) having, in the molecule, an epoxy group and at least one reactive functional group other than the epoxy group are reacted to introduce the reactive functional group into the surface of each of the fine microgel particles. Examples of the compound (B) include epoxy compounds having an unsaturated double bond such as glycidyl (meth)acrylate, N-glycidyl (meth)acrylamide, glycidylallyl ether, 1,2-epoxy-5-hexene, etc., epoxy compounds having a hydroxyl group such as glycidol, etc., epoxy compounds having a carboxyl group such as epoxy succinate, etc., and the like. These compounds for the compound (B) are suitably selected depending upon desired physical properties, and usable alone or in combination. In the reaction with the tertiary ammonium salt on the surface of the fine microgel particle, the amount of the compound (B) may be 1 to 100 mole % based on the tertiary ammonium salts.

This reaction is completed by only mixing an epoxy compound with an emulsion of the fine microgel particles and stirring the mixture at a temperature between 30° and 90° C., preferably between 60° and 80° C. for 2 hours or more. Namely, this invention has an advantage that the fine microgel particles can be reacted even in an aqueous dispersion.

The reactive microgels of this invention are provided as an aqueous dispersion or a dispersion thereof in an organic solvent prepared by removing whole or part of their water content by azeotropy with benzenes, alcohols, ketones, etc. The reactive microgels can be converted to a dry form by a usual method, preferably by a method of coagulating the microgels, then washing the coagulation product, drying it and milling it or by a spray drying method. The microgels can be coagulated by salt-precipitation in which sodium chloride is added.

In the reactive microgels obtained according to the process of this invention, the degree of crosslinkage within the fine microgel particle is controlled by selection of monomers having a polymerizable double bond, etc., whereby the microgel per se can be imparted with a film-forming ability and used in a resist material. Further, it is also possible to obtain resin compositions having excellent properties by suitably selecting degrees of crosslinkage and functional groups on the surface, and incorporating the resultant microgels into resins.

Water-soluble photohardenable resin compositions containing reactive microgels obtained according to the process of this invention will be explained hereinbelow.

A photohardenable resin composition containing reactive microgels is crosslinked with UV rays, electron beams, etc., after an additive, e.g. a photopolymerization initiator, etc., other hydrophilic resin and a hydrophilic monomer are added as required. The content of the reactive microgels in the photohardenable resin composition is 20 to 90% by weight, preferably 40 to 80% by weight, based on a water-soluble resin. The crosslinkage can take place by radiation without using any photopolymerization initiator. When UV rays are irradiated, however, efficiency of crosslinkage can be improved by addition of a suitable photopolymerization initiator. Examples of the photopolymerization initiator include benzophenone, 2-hydroxy-2-methyl-1-phenyl-propan-1-one, 1-(4-isopropylphenyl)-2-hydroxy-2-methylpropan-1-one, 2-methyl-1-[4-(methylthio)-phenyl]-2-morpholinopropanone-1, etc. These photopolymerization initiators are usable in an amount of 0.1 to 10 parts by weight based on 100 parts by weight of a resin. Examples of the above-mentioned "other hydrophilic resin" include polyvinyl alcohol, carboxymethyl cellulose, methyl cellulose, hydroxyethyl cellulose, poly(meth)acrylate, casein, gelatin, starch, polyvinyl pyrrolidone, poly(meth)acrylamide, chitosan, a polymer containing a quaternary ammonium salt, and the like. Examples of the hydrophilic monomer include N,N-methylenebis(meth)acrylamide, 1,2-di(meth)acrylamide ethylene glycol, N,N-oxymethylenebisacrylamide, (meth)acrylamide, vinyl pyrrolidone, 2-hydroxyethyl (meth)acrylate, polyoxyethylene (meth)acrylate, polyoxyethylene di(meth)acrylate, and the like. Further, to impart the resin of this invention with various functions, it is possible to incorporate a colorant, extender pigment, lubricant, plasticizer, stabilizer, flame retardant, antifoamer, oxidation preventor, sterilizer, electrically conductive material, magnetic material, etc.

According to this invention, there is provided a process for the production of microgels, which makes it possible to attach a variety of functional groups to the surface of each of fine microgel particles quantitatively without isolating the fine microgel particles from an aqueous dispersion thereof.

Further, according to this invention, there is provided a process for the production of microgels, in which degree of crosslinkage within each of fine microgel particles can be controlled to make the microgels per se useful as a resist material.

According to this invention, there is also provided a resin composition containing the microgels formed in the process of this invention. This resin composition produces effects on improvement of various properties of resin compositions such as photosensitivity, water resistance, solvent resistance, etc., by suitably selecting functional groups to be attached to the surface of the microgel. For example, a resin composition containing the microgels having a (meth)acryl group as a functional group on the surface is suitable as a photosensitive material especially for a coating composition, ink, photohardenable adhesive, printing substrate, machine plate, etc.

The following Examples explain processes for the production of reactive microgels and changes in physical properties of resins containing the reactive microgels. In Examples, part stands for part by weight, and % for % by weight.

EXAMPLE 1

Process for the production of reactive microgels

I. Aqueous solution of cationic polymer emulsifier

While 100 parts of butyl methacrylate, 100 parts of 2-dimethylaminoethyl methacrylate and 200 parts of 2-propanol were stirred in a 2-liter reactor under nitrogen atmosphere, they were heated to 80° C. 1 part of azobisisobutyronitrile (to be referred to as AIBN hereinbelow) was added, and the mixture was maintained at the above temperature for 1 hour. Then, 0.2 part of AIBN was added every 30 minutes 5 times while the mixture was maintained at 80° C. The resultant reaction product was further maintained at 80° C. for 3 hours after the final addition of AIBN to complete polymerization. The product was cooled to room temperature, then 38.2 parts of acetic acid was added, and the mixture was stirred for a while. Then, 1,000 parts of water was added, and the mixture was heated to remove the 2-propanol by azeotropy, whereby an aqueous solution of a cationic polymer emulsifier was obtained. Further, part of the water was removed by distillation to adjust this emulsifier solution to a solid content of 20%.

II. Reactive microgels

While 27 parts of styrene, 3 parts of divinyl benzene, 75 parts of an aqueous solution of the cationic polymer emulsifier and 185 parts of deionized water were stirred in a 500-milliliter reactor under a nitrogen atmosphere, they were heated to 65° C. 8 Parts of a 3% aqueous solution of 2,2-azobis(2-amidinopropane) dihydrochloride (to be referred to as AAPD hereinbelow) was added, and immediately thereafter, the mixture was heated to 80° C. and maintained at this temperature for 2 hours. Then, 2 parts of a 3% aqueous solution of AAPD was added, and after the addition, the resultant reaction mixture was maintained at 80° C. to complete polymerization (for nonreactive fine microgel particles). The particle diameter thereof was measured by an optical scattering method to show about 50 nm. The resultant microgel aqueous dispersion was cooled to room temperature, and left to stand overnight. Then, 2.7 parts of glycidyl methacrylate was added and the mixture was heated to 80° C. under air. The resultant reaction mixture was maintained at 80° C. for 4 hours to complete the reaction (for reactive microgels).

EXAMPLES 2-3 and COMPARATIVE EXAMPLES 1-2

The reactive microgels having a methacryl group on the surface, synthesized in Example 1, were added to a nonphotosensitive acrylic resin (Example 2) and to a photosenstive acrylic resin (Example 3) to examine changes in tensile strength. The cationic polymer synthesized in Example 1-I was used as the nonphotosensitive acrylic resin above. Further, as the photosensitive acrylic resin, there was used a polymer prepared by modifying 5% of the quaternary ammonium groups of the above cationic polymer with glycidyl methacrylate.

| Component | Weight (g) |
| --- | --- |
| Aqueous solution of 20% acrylic resin | 10 |
| Aqueous dispersion of 15% reactive microgel | 3.3 |
| Photopolymerization initiator (Darocure 2959, product name, manufactured by Merk Co.) | 0.075 |

The above components were mixed and heated to 60° C. The mixture was stirred until it was homogeneously mixed as a whole, and maintained at 60° C. The homogeneous mixture was charged into a box made of Teflon and having interior length and width sizes of 9 cm and a depth of 3 mm, and the box was placed on a horizontal base, covered with a shading sheet, and left to stand at room temperature until a film was formed on the surface. When the film was formed, the box was put into an oven at 60° C. to dry the film overnight. The resultant dry film had a thickness of about 0.2 mm. The film was cut into strips having a width of 1 cm to measure tensile strength. The above procedure was repeated except that the nonreactive microgel particles obtained in Example 1-II were added to the above nonphotosensitive acrylic resin or the photosensitive acrylic resin, and the resultant films were measured for tensile strength. Table 1 shows changes in tensile strength of films obtained by incorporating the reactive microgel particles or nonreactive microgel particles into the nonphotosensitive acrylic resin or photosensitive acrylic resin and subjecting the resultant films to irraidation with 100 mJ UV rays or no irradiation.

TABLE 1

| | Tensile strength (kg/cm$^2$) | |
| --- | --- | --- |
| Sample | No UV irradiation | UV irradiation |
| Example 2 (Nonphotosensitive resin + reactive microgels) | 10.5 | 22.9 |
| Example 3 (Photosensitive resin + reactive microgels) | 9.8 | 102.1 |
| Comparative Example 1 (Nonphotosensitive resin) | 10.2 | 9.5 |
| (Nonphotosensitive resin + nonreactive microgels) | 8.9 | 8.8 |
| Comparative Example 2 (Photosensitive acrylic resin) | 5.8 | 52.7 |
| (Photosensitive resin + nonreactive microgels) | 8.3 | 64.9 |

EXAMPLE 4

While 27 Parts of styrene, 3 parts of divinyl benzene, 75 parts of an aqueous solution of the cationic polymer emulsifier obtained in Example 1 and 185 parts of deionized water were stirred in a 500-milliliter reactor under nitrogen current, they were heated to 80° C. 8 parts of a 3% aqueous solution of AAPD was added, and this temperature of the mixture was maintained for 2 hours. Then, 2 parts of a 3% aqueous solution of AAPD was added, and thereafter, the resultant reaction mixture was maintained at 80° C. to complete the reaction. The resultant aqueous dispersion of microgel particles was cooled to room temperature, and left to stand overnight. Then, 1.4 parts of glycidol was added, and the mixture was maintained under air under heat at 80° C. for 4 hours to give reactive microgels containing a hydroxyl group.

EXAMPLE 5

Example 4 was repeated except that 2.5 parts of epoxy succinate was used in place of 1.4 parts of glycidol, whereby reactive microgels containing a carboxyl group were obtained.

EXAMPLE 6

Process for the Production of Reactive Microgel

I. Cationic polymer emulsifier

While 100 parts of hexyl methacrylate, 100 parts of 2-dimethylaminoethyl methacrylate and 200 parts of 2-propanol were stirred in a 2-liter reactor under nitrogen atmosphere, they were heated to 80° C. 1.6 parts of AIBN was added, and the mixture was maintained at 80° C. for 2 hours. Then, 0.4 part of AIBN was added and the resultant reaction mixture was maintained at 80° C. for 4 hours to complete polymerization. The reaction mixture was cooled to room temperature, then a mixture of 38.2 parts of acetic acid with 1,000 parts of water was added, and the resultant mixture was heated to remove the 2-propanol and water by azeotropy and adjust the solid content of the resultant emulsifier solution to 20%.

II. Reactive (photosensitive) cationic polymer emulsifier

Glycidyl methacrylate (18.1 parts) was added to the cationic polymer emulsifier synthesized in Example 6-I, and the mixture was heated to 70° C. under air atmosphere and maintained for 2 hours to give a photosensitive cationic polymer emulsifier having pendant methacryl groups.

III. Nonreactive microgel particles

While 12 parts of butyl methacrylate, 15 parts of ethylhexyl methacrylate, 3 parts of neopentyl glycol dimethacrylate, 75 parts of an aqueous solution of the reactive cationic polymer emulsifier synthesized in Example 6-II and 185 parts of deionized water were stirred in a 500-milliliter reactor under nitrogen atmosphere, they were heated to 80° C. 8 Parts of a 3% aqueous solution of azobisamidinopropane-dihydrochloride (to be referred to as AAPD hereinbelow) was added, and the mixture was maintained at 80° C. for 2 hours. Then, 2 parts of an aqueous solution of 3% AAPD was added. After the addition, the reaction mixture was maintained at 80° C. for 4 hours to complete polymerization. The diameter of the resultant microgel particles was measured by an optical scattering method to show about 50 nm.

IV. Reactive microgels

An aqueous dispersion of the nonreactive microgel particles synthesized in Example 6-III was left to stand overnight, then 2.7 parts of glycidyl methacrylate was added, the mixture was heated to 70° C. under air atmosphere, and the reaction product was maintained at this temperature for 2 hours to complete the reaction.

V. Evaluation of reactive microgels

The nonreactive microgel particles of Example 6-III (Comparative Example 3) and the reactive microgel particles of Example 6-IV (Example 6) were respectively dispersed in the photosensitive cationic polymer emulsifiers synthesized in Example 6-II, and then a photopolymerization initiator of 4-(2-hydroxyethoxy)-phenyl-(2-hydroxy-2-propyl) ketone (Darocure 2959, trade name, manufactured by Merk Co.) in an amount of 3% based on the dispersions was added to each of the dispersions to form, by a casting method, microgel dispersion films having a thickness of about 300 μm. The films were irradiated with UV rays at 200 mJ/cm$^2$. The films were immersed in deionized water or methyl ethyl ketone at room temperature for 3 hours, and their weight increases were examined to evaluate their water resistance and solvent resistance.

In addition, the above procedure was repeated to form a film except that no microgel was added, and water resistance and solvent resistance of the film were also evaluated as Comparative Example 4.

Table 2 shows the results.

TABLE 2

| Sample | Resistance | |
| --- | --- | --- |
| | to water | to solvent |
| Reference | 52% | 75% |
| Nonphotosensitive microgel | 42% | 102% |
| Photosensitive microgel | 32% | 48% |

As is clear in the above Table 2, the nonreactive (nonphotosensitive) microgels exhibited improved water resistance but exhibited poorer solvent resistance. In contrast, the reactive (photosensitive) microgels were excellent both in water resistance and solvent resistance.

EXAMPLE 7

While 27 parts of butyl acrylate, 3 parts of ethylene glycol dimethacrylate, 75 parts of an aqueous solution of the cationic polymer emulsifier synthesized in Example 6-I and 185 parts of deionized water were stirred in a 500-milliliter reactor under nitrogen current, they were heated to 80° C. 8 Parts of a 3% aqueous solution of AAPD was added, and the mixture was maintained at the above temperature for 2 hours. Then, 2 parts of a 3% aqueous solution of AAPD was added, and the reaction mixture was maintained at 80° C. to complete the reaction. The resultant microgel aqueous dispersion was cooled to room temperature and left to stand overnight, then 1.4 parts of glycidol was added, and the mixture was maintained under air current under heat at 70° C. for 2 hours to give reactive microgels containing hydroxyl groups.

EXAMPLE 8

Example 6 was repeated to form reactive microgels containing carboxyl groups except that 2.5 parts of epoxy succinic acid was used in place of 1.4 parts of glycidol in Example 6-III.

EXAMPLE 9 and COMPARATIVE EXAMPLE 5

Glycidyl methacrylate (72.4 parts) was added to the photosensitive cationic polymer emulsifier synthesized in Example 6-II, and the mixture was stirred at 70° C. for 2 hours to react the glycidyl methacrylate with all of quaternary ammonium salts, whereby a water-soluble photosensitive polymer was prepared.

2 parts of the water-soluble photosensitive polymer, 40 parts of the reactive microgel dispersion (having a solid content of 20%) obtained in Example 6-IV and 0.5 part of Darocure 2959 (trade name, manufactured by Merk Co.) were mixed and formed into resin sheets having a thickness of about 1 mm by a casting method. These resin sheets and commercially available sheets (photosensitive resin sheets formed of an acrylic monomer having a side chain of acetyl group of partial saponification polyvinyl acetate, trade name, NAPP, manufactured by Nippon Paint K.K., Comparative Example 5) were irradiated with UV rays at 500 mJ/cm$^2$, and immersed in deionized water at room temperature (25° C.) to examine their weight increases.

Table 3 shows the results.

TABLE 3

| Sample Immersing time | The invention, | Commerical sheets |
| --- | --- | --- |
| 1 hour | 5% | 18% |
| 2 hours | 6% | 25% |
| 3 hours | 7% | 29% |
| 4 hours | 8% | 35% |

EXAMPLE 10

I

The procedure of Example 6 was repeated to form reactive microgels except that the amount (12 parts) of butyl methacrylate was changed to 28.5 parts, and that 15 parts of ethylhexyl methacrylate was changed to 1.5 parts of ethylene glycol dimethacrylate.

II

3% Darocure 2959 (trade name, manufactured by Merk Co.) was added to an aqueous dispersion of the reactive microgel obtained above to form microgel dispersion films having a thickness of 300 μm. The films were irradiated with 1,200 mJ UV rays, and then immersed in deionized water or isopropyl alcohol at room temperature (25° C.) to examine their weight increases.

Table 4 shows the results.

TABLE 4

| Immersing time | Absorptivity | |
| --- | --- | --- |
| | to water | to alcohol |
| 1 hour | 5.4 | 11.2 |
| 2 hours | 6.2 | 17.0 |
| 3 hours | 6.2 | 21.0 |
| 4 hours | 6.1 | 24.0 |

What is claimed is:

1. A hardenable resin composition comprising a reactive microgel having a functional group on a surface of each of fine particles of the microgels, said microgel being produced by a process which comprises reacting fine microgel particles (A) synthesized from a monomer having a polymerizable double bond by emulsion polymerization using, as an emulsifier, a compound containing tertiary ammonium salt, with a compound (B) having, in the molecule, an epoxy group to react with the tertiary ammonium salt and at least one reactive functional group other than the epoxy group, and a resin.

2. A hardenable resin composition according to claim 1, which is photohardenable.

3. A hardenable resin composition according to claim 1, which is thermosetting.

4. A hardenable resin composition according to claim 1 wherein the reactive microgels are contained in an amount of 20 to 90 parts by weight based on 100 parts by weight of the resin.

5. A hardenable resin composition according to claim 1, which is water-soluble and photohardenable.

6. A hardenable resin composition according to claim 5 wherein a photopolymerization initiator is further contained in an amount of 0.1 to 10 parts by weight based on 100 parts by weight of the resin.

7. A hardenable resin composition according to claim 5, which further contains a hydrophilic monomer and/or a water-soluble resin.

* * * * *